United States Patent [19]
Watkins

[11] Patent Number: 5,928,472
[45] Date of Patent: Jul. 27, 1999

[54] PAPER WEB AND PROCESS FOR MAKING THE SAME

[76] Inventor: Kenneth S. Watkins, 372 River Dr., Dahlonega, Ga. 30533

[21] Appl. No.: 08/922,616

[22] Filed: Sep. 3, 1997

[51] Int. Cl.⁶ .......................... D21F 13/00; D21H 27/30
[52] U.S. Cl. .......................... 162/132; 162/103; 162/124; 162/129; 162/218; 162/134; 162/147; 264/121
[58] Field of Search ...................... 162/103, 104, 162/124, 125, 129, 132, 201, 218, 219, 134, 147; 264/121, 122, 518

[56] References Cited

U.S. PATENT DOCUMENTS

| | | | |
|---|---|---|---|
| 28,370 | 5/1860 | Howell, Jr. | |
| 3,954,554 | 5/1976 | Curry et al. | 162/104 |
| 4,046,622 | 9/1977 | Attwood et al. | 162/132 |
| 4,115,602 | 9/1978 | Bullard | 427/140 |
| 4,324,753 | 4/1982 | Gill | 264/121 |
| 4,913,775 | 4/1990 | Langley et al. | 162/164.3 |
| 5,061,344 | 10/1991 | Wedlin et al. | 162/129 |
| 5,612,766 | 3/1997 | Iida et al. | 399/23 |
| 5,632,856 | 5/1997 | Buie | 162/4 |

Primary Examiner—Peter Chin
Assistant Examiner—Steven B. Leavitt
Attorney, Agent, or Firm—Kenneth S. Watkins, Jr.

[57] ABSTRACT

A multiply paper web comprises a base ply of a post-manufactured sheet such as reused old newsprint or reused office waste. An upper and/or lower ply is bonded to the base ply to cover any printing or contamination of the base ply, thus allowing the resulting web to be reprinted or used for writing or packaging grades. The base ply is not repulped, reducing water and energy usage in the manufacturing process. The upper and lower plies may be wet formed or dry formed. Dry formed upper and/or lower plies result in a paper product utilizing little or no water in the manufacturing process, and no aqueous effluent. The post-manufactured base ply provides the strength ply.

32 Claims, 3 Drawing Sheets

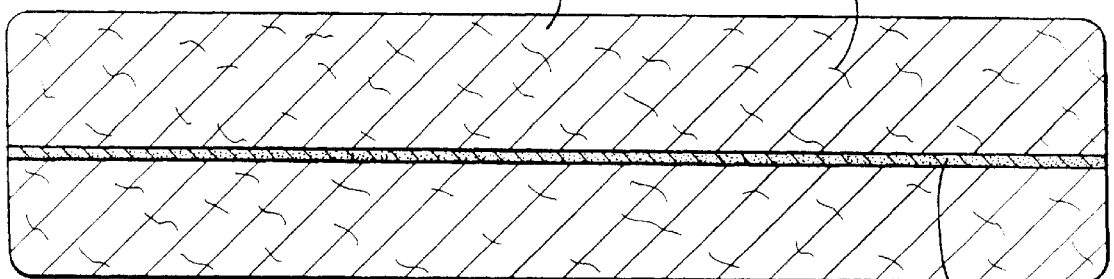
FIG. 1
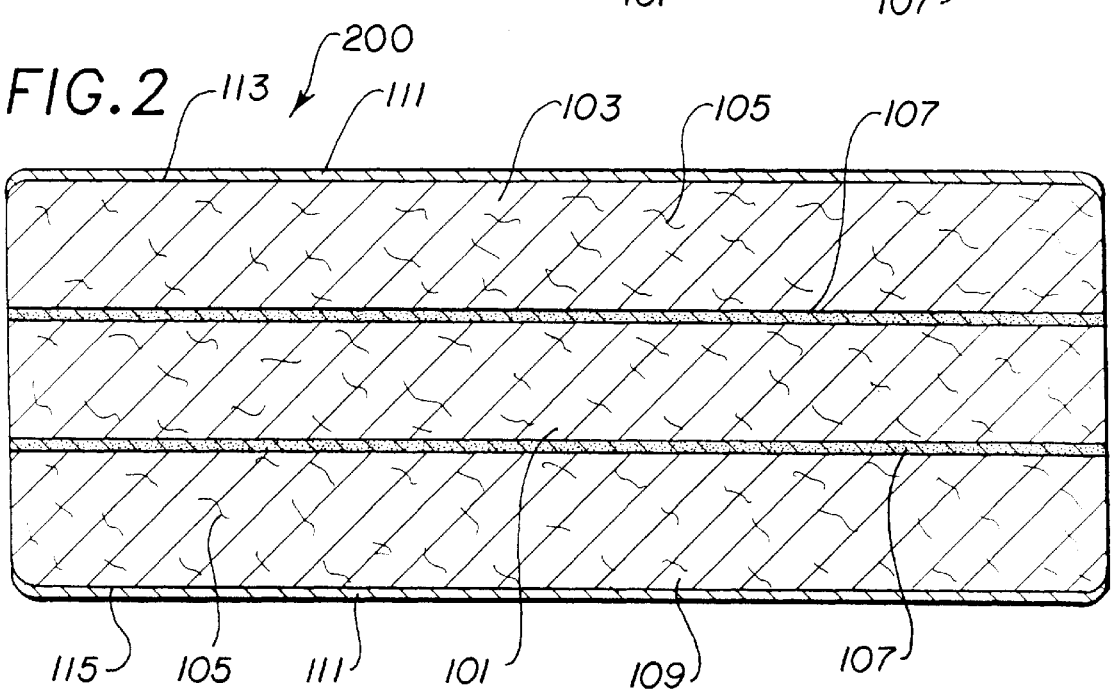
FIG. 2
FIG. 6
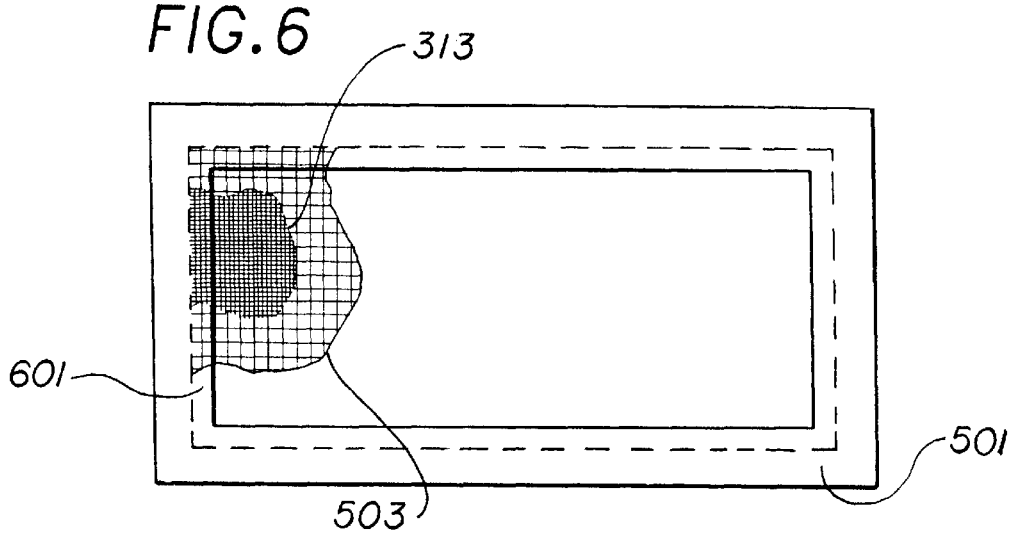

PAPER WEB AND PROCESS FOR MAKING THE SAME

BACKGROUND OF THE INVENTION

The present invention relates to paper webs and, more particularly, to multiply paper webs utilizing recycled paper.

Mounting economic and environmental pressures have led to increased use of recycled paper in the production of paper and paperboard. Reduction of available timberlands have resulted in higher pulpwood prices. Costs associated with compliance with ever increasing air and water cleanup standards have added significant capital costs to paper and paperboard production. Increasing pressures from national, state and local governments and consumer groups to reduce landfill and timber resource usage have all been factors in the increased use of recycled fiber.

However, recycling paper and paperboard has created a new set of technical, operational, economic and environmental problems. Collection and separation of paper and paperboard products is labor intensive, increasing costs. The recycled paper and paperboard must be repulped, cleaned and often de-inked, requiring large quantities of water, chemical usage, and resulting in the need for water treatment. The process is energy intensive due to the need to repulp the wastepaper, pump large quantities of dilute stock, and drain and evaporate large quantities of water. Recycled furnishes cause fouling of stock preparation and papermaking equipment, resulting in increased downtime, further increasing the cost. Continued recycling of the same fibers results in reduction of long fibers, reducing paper strength. Resulting buildups of the shorter fiber and fines reduces drainage on the paper machine, requiring additional drainage equipment and chemical usage. Finally, quality of the recycled paper grades is more difficult to maintain than virgin paper grades. All of the above factors have resulted in increased cost, limiting the use and percentage of recycled fibers in paper and paperboard.

Paper mills, including recycled paper and board mills are capital intensive, partly due to the large amount of equipment required to pump, mix, drain and evaporate the large volumes of water required in the process. This capital intensive aspect has led to large mills widely dispersed, leading to high transportation costs for the furnish used to make the paper as well as transporting of the finished products to the end users.

Alternative processes of recycled paper and paperboard production have sought to answer some of the problems addressed above. Many of these processes incorporate methods to reduce the detrimental effects of using recycled fibers in the production of paper and paperboard. None of the processes significantly addresses better utilization of recycled paper and paperboard.

OBJECTS AND SUMMARY OF THE INVENTION

Therefore and object of the present invention is to provide an improved recycled paper web for printing, writing, and packaging and the like, and a process for making the paper web which better utilizes recycled paper and paperboard.

A further object of the present invention is to provide an improved recycled paper web which comprises several plies, at least one ply being a reused sheet of paper which has not been repulped, thereby reducing fresh water usage, wastewater treatment, energy usage in the dryer section, and landfill usage.

A further object of the present invention is to provide an improved recycled paper web in which the outer plies are dry formed, reducing water usage, drying energy and equipment capital costs.

A further object of the present invention is to reduce transportation costs by providing an improved recycled paper web and process for making the web which is simple, low in capital costs, environmentally clean and well suited for placement in small market locations which allow local recycled fiber collection and product usage.

The paper web of the present invention comprises a multiply paper web in which the base or strength ply of the web is a reused sheet of paper. In the preferred embodiment, the base ply comprises a sheet of reused newsprint or reused office waste paper. The base ply may comprise printing on one or both sides or surfaces of the sheet. In the preferred embodiment, an upper and lower ply are bonded to the top and bottom sides of the base sheet to cover any printing, contamination, or sheet damage, allowing the resulting multiply web to be used as a new sheet.

In the preferred embodiment, the upper and lower plies are dry formed from comminuted wastepaper fibers and a ply bonding agent is used to bond the upper and lower plies to the base ply. The ply bonding agent may be dispersed into the upper and lower plies for example, by pressing, increasing the internal bond strength of the upper and lower plies. Alternatively, a separate internal bonding agent may be used to provide the internal bonding of the upper and lower ply fibers. In an alternative embodiment, the upper and lower plies are wet formed and bonded to the base ply.

In still another embodiment, at least one surface of the reused base ply is mechanically or chemically de-inked before applying the upper and/or lower ply. This process removes at least some of the inks present on the printed surface of the reused paper used as the base ply, reducing the basis weight required for adequate coverage of printing in the upper and lower plies. This embodiment lowers the basis weight of the final sheet.

The paper web of the present invention utilizes a reused sheet to provide a substantial part of a new paper web. The strength provided by the reused sheet as the base ply of the multiply sheet allows lower strength dry formed upper and lower plies. The need for repulping wastepaper is eliminated, reducing water usage, eliminating liquid effluent, and significantly reducing energy required to dry the web as compared with conventional recycled paper manufacturing.

BRIEF DESCRIPTION OF THE DRAWINGS

These and other features, aspects and advantages of the present invention will become better understood with regard to the following description, appended claims and accompanying drawings where:

FIG. 1 is a cross section drawing of a two ply web utilizing a post-manufactured sheet as the base ply;

FIG. 2 is a cross section drawing of a three ply web utilizing a post-manufactured sheet as the base ply;

FIG. 6 is a top plan view of the forming screen of FIG. 4 showing part of the screen of FIG. 4, forming support screen and the forming screen frame.

DESCRIPTION OF THE PREFERRED EMBODIMENTS

Figure 3:
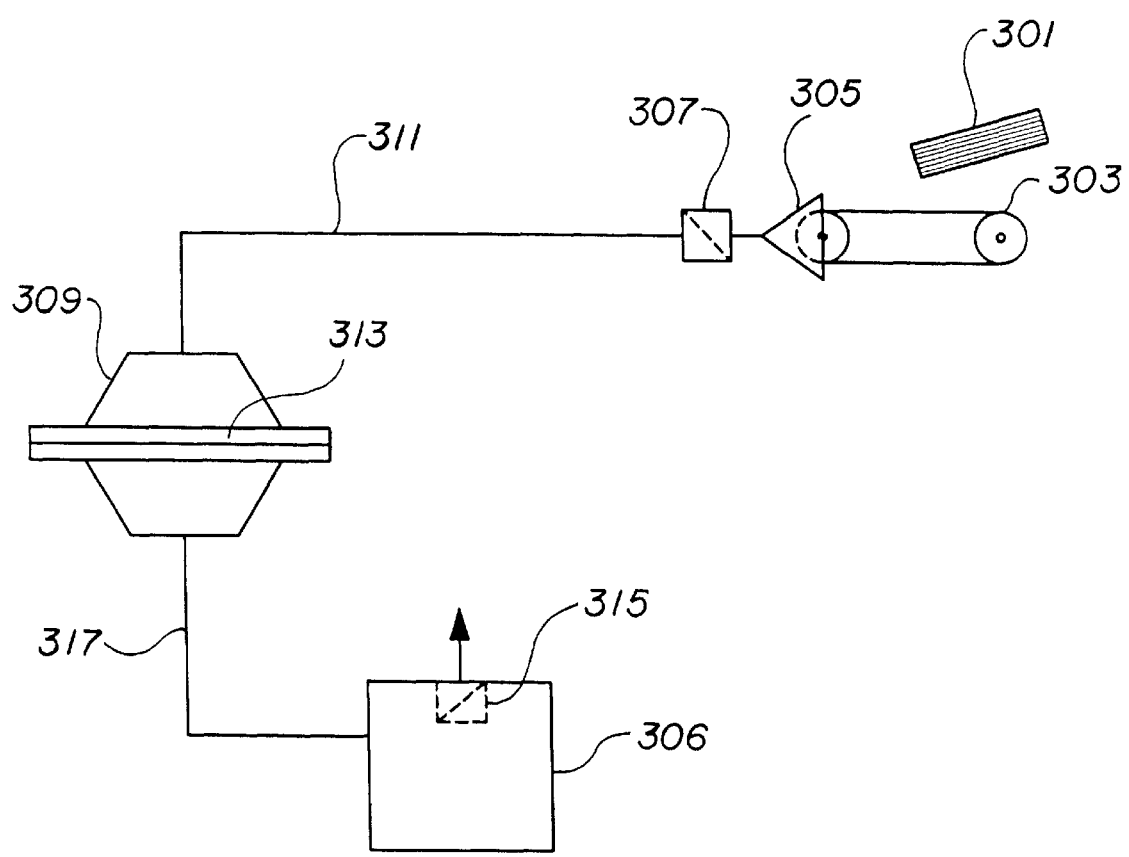
FIG. 3 is a schematic diagram of the dry forming apparatus used in making the web of the present invention.

The following is a description of the preferred embodiments of a multiply paper web for printing, writing, and packaging or the like, utilizing a post-manufactured base ply.

The following definitions apply to terms used in the specification:

Post-manufactured paper: Paper which comprises at least one ply which has been wet formed from an aqueous suspension comprising cellulose fibers, dried, and the paper further processed by a finishing operation. Finishing operations are operations which prepare paper products for shipment and include, but are not limited to, winding, slitting, sheeting, baling, cutting, sorting, counting, cartoning, palletizing, and wrapping.

Post-consumer waste (PCW): Discarded paper products collected from residences, institutions, organizations, offices, stores and businesses.

Old newsprint (ONP): Discarded newsprint paper collected from residences, institutions, organizations, offices, stores and businesses.

Office waste (OW): Discarded fine paper grades such as copy papers, bond grades, and fine printing and writing grades collected from residences, institutions, organizations, offices, stores and businesses.

Reused newsprint (RNP): Post-manufactured newsprint paper, printed or unprinted, which forms at least one ply of a multiply paper web, the reused newsprint ply being used in the multiply web without repulping.

Reused office waste (ROW): Post-manufactured office waste paper, printed or unprinted, which forms at least one ply of a multiply paper web, the reused office waste ply being used in the multiply web without repulping.

FIG. 1 is a cross section of embodiment 100 of the paper of the present invention. Paper sheet or web 100 comprises two plies, base ply 101 and upper ply 103. Base ply 101 is a web or sheet of post-manufactured paper as defined above and may include (but is not limited to) reused grades of newsprint, coated or uncoated groundwood papers, coated and uncoated publication papers, woodfree and wood containing fine papers, sack papers, bag papers, linerboard, boxboard, chipboard, bristols, tissue and non-woven grades. Paper of the present invention meets the definition of post-manufactured paper when the paper of the present invention is processed by a finishing operation.

In the preferred embodiments, base ply 101 is reused newsprint (RNP) or reused office waste (ROW) which has been printed on one or both sides (printing not shown). Post-manufactured paper of the preferred embodiments has been dried to a consistency of at least 85% oven dry, and more preferably, at least 90% oven dry before the finishing operation(s). The post-manufactured paper preferably has a basis weight (oven dried) of at least 20 grams per square meter, and more preferably, at least 40 grams per square meter.

Upper ply 103 comprises papermaking fibers 105 which have been formed and bonded together by an internal or dispersed bonding agent (not shown). Upper ply 103 is bonded to base ply 101 by a bonding agent such as ply bonding agent 107. Fibers 105 may include mechanically separated, chemically separated, or repulped papermaking fibers, fiber bundles, fiber clumps, and fiber fines. Also present in upper ply 103 may be filler particles and other additives. In the preferred embodiment, fibers 105 comprise cellulose papermaking fibers, fiber bundles, fines, and filler particles. In other embodiments, fibers 105 may comprise synthetic fibers. Fibers 105 may be bonded to each other by a second bonding agent dispersed in upper ply 103 (not shown). The second bonding agent dispersed in fibers 105 may be the same as ply bonding agent 107 or, alternatively, a different bonding agent may be used.

Fibers 105 may comprise mechanical or chemical papermaking fibers, fiber bundles, and fines from comminuted recycled paper grades such as old newsprint, or office waste, comminuted clippings from box, card, packaging or converting operations, comminuted off-standard paper grades, comminuted dried pulp, dried and comminuted plant matter such as cornstalk, corncob, and leaves, or synthetic fibers. In the preferred embodiments, fibers 105 are comminuted old newsprint or office waste fibers, fiber bundles, and fines. In other embodiments, fibers 105 are virgin or repulped cellulose fibers wet formed into a separate ply and bonded to base ply 101 by bonding agent 107.

Ply bonding agent 107 bonds upper ply 103 to base ply 101. A second internal or dispersed bonding agent (not shown) may be used to bond fibers 105 to each other to increase the internal strength of upper ply 103. Ply bonding agent 107 may include (but is not limited to) modified or unmodified starches, natural or synthetic resins and adhesives. In the preferred embodiment, the ply bonding agent 107 is modified starch. Ply bonding agent 107 may be applied to the top surface of base ply 101 by spray, brushing, or blade or roll coating prior to combining with upper ply 103. Alternatively, ply bonding agent 107 may be applied to the bottom surface of upper ply 103 prior to the combining with base ply 101.

Ply bonding agent 107 may be dispersed among fibers 105 of upper ply 103 after combining of upper ply 103 to base ply 101 to form the internal or dispersed bonding agent. Ply bonding agent 107 may be dispersed by absorption, aided by operations such as pressing or heating. In other embodiments, the same or different bonding agent may be sprayed on or mixed with upper ply 103 during or after forming to provide the internal bonding of upper ply 103. In wet formed upper plies, hydrogen bonds between the fibers may take the place of the internal bonding agent.

In still other embodiments, ply bonding agent 107 may be provided by a bonding agent applied to other areas of base ply 101 or upper ply 103 and dispersed into the interface (ply bonding agent 107 location) between base ply 101 and upper ply 103 after combining the plies. For example, a bonding agent may be applied to the top surface of upper ply 103 or the bottom surface of base ply 101 or dispersed in base ply 101 or upper ply 103 if followed by a dispersing process, such as pressing, which disperses the bonding agent across the interface of upper ply 103 and base ply 101.

FIG. 2 is a cross section of embodiment 200 of the paper of the present invention. Paper web or sheet 200 comprises three plies; base ply 101, upper ply 103 and lower ply 109. Base ply 101 is a post-manufactured ply as defined previously. Lower ply 109 is comprised of fibers 105 which are bonded by an internal bonding agent (not shown). The structure and composition of lower ply 109 may be the same as upper ply 103 described above. Upper ply 103 is bonded to base ply 101 and lower ply 109 is bonded to base ply 101 by ply bonding agent 107.

In practice, upper ply 103 or lower ply 109 may comprise several layers (not shown) of the same or different fibers within the ply. For example, fibers 105 of upper ply 103 may comprise clean, high-brightness fibers (such as comminuted bleached pulp fibers) near top surface 113 forming a top layer of upper ply 103 and lower brightness fibers (such as comminuted waste paper fibers) near the bottom, forming a bottom layer of upper ply 103. The dispersed or internal bonding agent may be used to bond the layers. Alternatively, additional upper plies (not shown) may be formed and bonded to top surface 113 of upper ply 103 by ply bonding agent 107. A similar structure may be employed for lower ply 109.

A coating 111 may be bonded to the top surface 113 of upper ply 103 and the bottom surface 115 of lower ply 109. Coating 111 improves the brightness, smoothness and gloss of paper 200 and may comprise a combination of pigments, binders, and brightening agents known in the art.

In alternative embodiments of the present invention, upper ply 103 and/or lower ply 109 may be wet formed by a Fourdrinier, cylinder mold, twin wire former, or other wet formers, as known in the art, and bonded to base ply 101.

FIG. 3 is a schematic diagram of a fiber comminuting device and dry former used in the examples of this specification.

Fiber source 301 is comminuted by a comminuting device 303. In one embodiment, a hammermill was used as the comminuting device. In other embodiments, an abrasive belt was used to comminute the fiber source. Other examples of comminuting devices include fiberizers, refiners, grinders, and other cutting, separating and abrasive devices. Fiber source 301 may be in the form of sheets (loose, stacks, baled, or rolls), dried pulp (roll or baled), corrugated boxes (loose or baled), clippings from paper and board converters, loose or baled wastepaper, and loose or baled dried plant matter. In the preferred embodiments, post consumer waste paper is used as the fiber source.

Collection duct 305 collects comminuted fibers from comminuting device 303. Vacuum source 306 provides the pressure differential necessary to convey comminuted fibers, fibers, fines, fiber clumps, and other furnish particles suspended in air from comminuting device 303 to dry former 309 via air duct 311. Comminuted fibers form a web on forming screen 313 of dry former 309. Air duct 317 connects former 309 to vacuum source 306. Filter 307 comprises a screen to remove large fiber clumps and contaminants. Exhaust filter 315 removes remaining particles and fines before exhausting to atmosphere.

Figure 4:
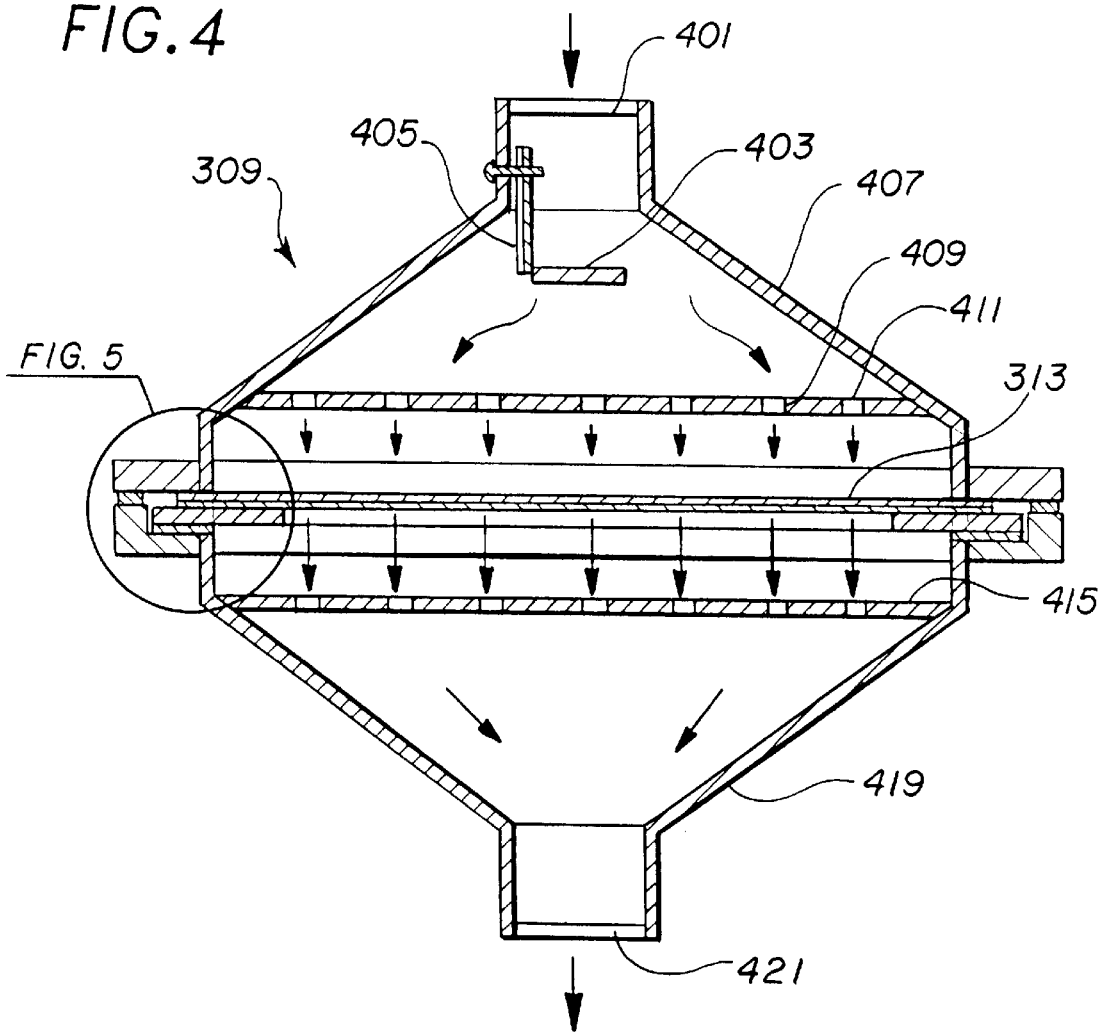
FIG. 4 is a cross section of the dry former of the apparatus of FIG. 3, showing the expansion chamber, forming screen and collection chamber.

FIG. 4 is a detail cross section of dry former 309 of FIG. 3. Comminuted fibers (not shown) enter inlet 401 of dry former 309 under the pressure differential induced by vacuum source 306 of FIG. 3. Deflector plate 403 supported by bracket 405 from expansion chamber 407 prevents channeling of the comminuted fibers. The comminuted fibers are slowed and dispersed in expansion chamber 407. Baffle plate 409 provides additional dispersal and uniformity of fiber flow.

The pressure drop created by baffle plate 409 increases the velocity of the fiber flow through the reduced cross sectional area formed by holes 411. The resulting flow velocity increase into holes 411 of baffle plate 409 and flow velocity decrease after baffle plate 409 creates shear forces which further break up fiber clumps and improve formation of the web on forming screen 313. Baffle plate 409 comprises 0.635 cm punched holes on 1.7 cm centers. Several trials utilized a second baffle plate 415 downstream of forming screen 313. Collection chamber 419 collects air passing through forming screen 313 and fines and small particles not retained on forming screen 313. Outlet 421 provides a connection to vacuum source 306 through air duct 317.

Figure 5:
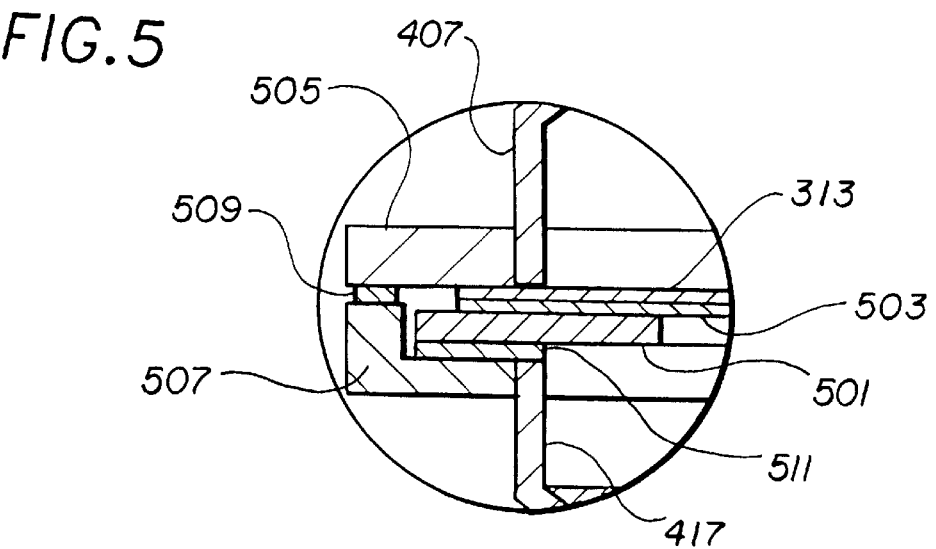
FIG. 5 is a detailed cross section of expansion chamber—collection chamber joint area of FIG. 4, showing the arrangement of the forming screen, forming support screen, and forming screen frame.

FIG. 5 is a detail of forming screen 313 in the expansion chamber—collection chamber joint area of FIG. 4. Forming screen frame 501 is a rectangular frame supporting forming support screen 503 and forming screen 313. Forming screen 313, forming support screen 503 and forming screen frame 501 are positioned and clamped between table top 505 of expansion chamber 407 and table bottom 507 of collection chamber 417. Table seal 509 seals table top 505 and table bottom 507 and prevents entry of outside air from the joint between table top 505 and table bottom 507. Forming screen seal 511 seals forming screen frame 501 and table bottom 507, preventing bypassing of suspended fibers and air around forming screen 313. The screened area of forming screen 313 inside forming screen frame 501 is rectangular, 10 cm by 15 cm.

FIG. 6 is a plan view of forming screen 313 stretched over forming support screen 503. Forming screen 313 is bonded to forming support screen 503 in overlap portion 601 and forming support screen 503 is bonded to forming screen frame 501 in overlap portion 601. The choice of forming screen fabric will depend on the type and size of comminuted fibers, the paper grade being made and method of forming screen support. In one embodiment, forming screen 313 is made of a 40×60 mesh polymeric fabric. Forming support screen 503 of FIG. 5 is a 15 mesh aluminum screen. Other screens or fabrics of polymeric or metal materials may be used. Forming support screen 503 may be omitted if forming screen 313 is sufficiently stiff.

Three general process embodiments were utilized in making a multiply web having a post-manufactured base ply. In the first embodiment, an upper ply was separately dry formed on forming screen 313 of dry former 309 by conveying a gas such as air with suspended comminuted fibers through forming screen 313. The comminuted fibers were deposited on the top or entrance surface of the forming screen, forming the upper ply. A bonding agent was applied by spray, blade, roll or brush to the top surface of a post-manufactured base ply, typically reused newsprint (RNP) or reused office waste (ROW). The bonding agent side of the base ply was applied to the top surface of the upper ply while the upper ply was on forming screen 313 and the resulting two ply sheet was transferred or couched from forming screen 313. Light pressing of the base ply and the upper ply was used during the couching step to promote bonding of the plies and improve sheet removal from forming screen 313. In a variation of this forming method, upper ply 103 was transferred or couched from forming screen 313 before being applied to the bonding agent side of base ply 101. This process variation allowed bonding of either the top surface or bottom (forming screen) surface of upper ply 103 to the bonding agent side of base ply 101. Couching of upper ply 103 from forming screen 313 was improved by light pressing before removal of the ply.

In some examples, the two ply sheet was pressed after combination of the two plies to promote migration or dispersal of ply bonding agent 107 into the internal structure of the base ply and the upper ply.

By varying the type and solids content of the bonding agent, the amount of bonding agent applied, and the intensity of pressing of the web after combining the plies, the amount of penetration of the bonding agent through the web could be controlled. Sufficient ply bonding agent 107 and pressing allows migration of the ply bonding agent completely through base ply 101 and upper ply 103. In this manner, ply bonding agent 107 may be used as a ply bonding agent only or, alternatively, as a ply bonding agent and internal bonding agent to increase the dry strength of the upper and base plies. In other variations to this process embodiment, a bonding agent was applied to upper ply 103 before or after combining with base ply 101. Absorption, aided by pressing and/or heating, disperses the bonding agent through upper ply 103 and across the interface between upper ply 103 and base ply 101, providing the ply bonding agent 107.

The two ply sheet of FIG. 1 was dried on a photographic plate dryer. In some trials, a lower ply (109 of FIG. 2) was applied to base ply 101 before or after drying the two ply sheet. In other trials, a second upper ply (not shown) was formed and bonded to the top surface of upper ply 103, and a second lower ply (not shown) was formed and bonded to the bottom surface of lower ply 109. Any number of plies could be formed in such a manner. Different papermaking fiber grades may be used in each of the upper and lower plies.

The second process embodiment is another dry forming process and differed from the first in that the upper and lower plies were impingement formed. In impingement forming, a support plate (not shown) was substituted for forming screen 313 in dry former 309. A ply bonding agent was applied to the top surface of base ply 101 and the base ply placed on the support plate. Papermaking fibers suspended in the air flow created by vacuum source 306 impinge on the top surface of base ply 101 and accumulate, forming upper ply 103. Pressing of the web disperses the bonding agent into the papermaking fibers of upper ply 103 and base ply 101. The bonding agent is set by drying, bonding upper ply 103 to base ply 101. Bypass slots along the outside of the support plate allow a passageway for air to vacuum source 306. Impingement forming differs from separate ply dry forming in that in impingement forming there is essentially no airflow through the ply being formed.

Additional upper plies may be added by forming a second upper ply (not shown) by impingement forming the second upper ply over the first upper ply. Additional ply bonding agent 107 may be applied between plies. One or more lower plies may be added in a similar manner. Any number of layers within a ply may also be added, the difference being that ply bonding agent is not added between the layers, but rather an internal bonding agent provides bonding between the layers of the ply.

The third process embodiment utilized conventional wet forming for the upper and lower plies. A hand sheet upper or lower ply was formed on a 30 mesh monofilament forming screen (hand mold) placed in an aqueous fiber stock suspension. The stock suspension comprised a dry solids content of 0.2% to 2% by weight (oven dry basis). Fiber sources were the same as those used in dry forming. The stock suspensions were prepared by repulping the dry fiber sources in a blender. The hand sheet was drained. A bonding agent was applied to one side of the base ply comprising a post-manufactured sheet. The bonding agent side of the base sheet was applied to the top surface (opposite the forming screen) of the wet formed upper ply. The resulting two ply sheet was removed or couched from the mold, pressed and dried.

In another variation of the third process embodiment, the upper ply was couched from the mold, pressed between felts and applied to the bonding agent side of the base ply. In this process variation, either the top or bottom (forming screen) surface of the upper ply could be applied to the bonding agent side of the base ply. Pressing the two plies after combining disperses ply bonding agent 107 and improves ply bond. Another form of the embodiment adds the bonding agent to the aqueous stock solution before forming the upper ply.

The bonding agent (ply and dispersed) used in the trials included modified and unmodified corn starch, potato starch, and resins. Solids content varied between 1% and 10%. Other ply and dispersed bonding agents may be used such as other plant starches, gums, latices, resins, heat set adhesives, thermoplastic adhesives, radiation curable adhesives, multi-part adhesives such as epoxies, and other adhesives.

In one trial, the printed surface of the reused sheet (base ply) was abraded with an abrasive sheet prior to combining with the upper ply. Abrading the printed surface removed most of the ink used in the printing, as well as additional fiber on the printed surface. This process step also provided the benefit of reducing the basis weight of the top ply necessary to provide coverage of the printed surface. The total basis weight of the sheet was further reduced due to the resulting lower basis weight of the base ply. The same abrading step may be used as a de-inking process with fiber sources consisting of printed sheets prior to comminuting and forming into upper or lower plies. The de-inking process increases the brightness and cleanliness of the final paper web. Other de-inking processes that can be used include scraping, cutting, or shaving the printed surface of the post-manufactured sheet or sheets used as the upper/lower ply fiber source. Alternatively, the ink may be removed by dissolving or chemical processes.

Some sheet samples were coated with a commercial pigmented coating to improve brightness, smoothness and gloss. Although coated grades could be made by coating a post-manufactured base ply only, the amount of coating required to cover the printing would be greater than if an upper ply is formed on the base ply.

All basis weights are oven dry (o.d.) unless otherwise specified.

EXAMPLE 1

A two ply hand sheet was made utilizing a base ply of reused newsprint (RNP) and a dry formed upper ply. The base ply measured 10 cm×15 cm and the measured basis weight was 46.7 gm/m$^2$. A separate upper ply was dry formed using the apparatus of FIG. 3. Upper ply furnish was old newsprint (ONP) comminuted by a hammermill (Jacobsen Commander Model 2400, 2" cutters with 0.5" screen.) An 8 mesh screen was used for filter 307. A second 15 mesh screen filter was placed in the inlet to expansion chamber 407. The base ply was dried and weighed. Starch at 5% solids was brushed onto the top surface of the base ply and the sample weighed. The bonding agent used was Kofilm 280 anionic starch available from National Starch and Chemical Company. The starch was cooked at 88–91 degrees centigrade for 20 minutes. The upper ply was combined with the base ply by applying the starched side of the base ply against the top or entrance side of the dry formed ply on forming screen 313. The combined sheet was pressed lightly, approximately 1–2 pounds per lineal inch (PLI) with a 100 cm diameter cylinder against a flat plate while still on the forming screen to improve ply bond and allow removal of the sheet from the forming screen. The couched sample was pressed between a flat plate and a 0.32 cm thick rubber blanket at 20–30 PLI, to disperse the bonding agent, weighed and dried on a photographic dryer. The sample was weighed and surface sized with a commercial spray starch, weighed and dried. Measured results are as follows:

| | |
|---|---|
| Basis weight of base ply | 46.7 gm/m$^2$ |
| Basis weight of base ply + upper ply + starch | 104 gm/m$^2$ |
| Basis weight of upper ply | 49.0 gm/m$^2$ |
| Basis weight of bonding starch | 11.3 gm/m$^2$ |
| Basis weight final sized | 106 gm/m$^2$ |

EXAMPLE 2

This sample utilized a 10 cm×15 cm base ply of reused office waste (ROW), laser printed copy grade. The upper ply was separate ply dry formed on the apparatus of FIG. 3 utilizing ground office waste as the furnish. The comminuting device was an abrasive belt (6"×48"), 24 grit. Starch was Cato 270 cationic starch, available from National Starch and Chemical Company, cooked 20 minutes at 88–91 degrees C. Measured results are as follows:

| | |
|---|---|
| Basis weight of base ply | 74.0 gm/m$^2$ |
| Basis weight of base ply + upper ply + starch | 168.7 gm/m$^2$ |
| Basis weight of upper ply | 86.9 gm/m$^2$ |
| Basis weight of bonding starch | 7.8 gm/m$^2$ |
| Basis weight final sized (3 applications) | 177.3 gm/m$^2$ |

The dried sample was printed utilizing a laser printer.

EXAMPLE 3

This sample utilized a 10 cm×15 cm base ply of reused newsprint (RNP). The separate dry formed upper ply comprised two layers: a dry formed top layer of ground corn stalk and ground corn cob and an under-top layer of ground old newsprint (ONP). The under-top layer of ground old newsprint was dry formed over the top layer in dry former 309. Ply bonding starch was applied to the top surface of the base ply, and the base ply applied to the bottom (under-top layer) side of the upper ply. The sample was pressed to disperse the ply bonding agent, dried and weighed. No additional ply bonding agent was applied between the layers. A commercial spray starch was applied to the top surface of the upper ply twice and dried to surface size the sample. The upper ply components were comminuted with an abrasive belt, 40 grit. Measured results are as follows:

| | |
|---|---|
| Basis weight of base ply | 46.0 gm/m$^2$ |
| Basis weight of base ply + top layer + under-top layer + starch | 124.0 gm/m$^2$ |
| Basis weight of top layer + under-top layer | 72.7 gm/m$^2$ |
| Basis weight of bonding starch | 5.3 gm/m$^2$ |
| Basis weight final sized (2 applications) | 127.3 gm/m$^2$ |

EXAMPLE 4

This sample was prepared utilizing a base ply of reused newsprint (RNP), 10 cm×15 cm. Potato starch was brush applied to the top surface of the base ply, and an upper ply of old ground newsprint was formed by impingement forming. This process was repeated two additional times by applying starch on the top surface of the upper ply by spraying and then impingement forming to form a sheet with a base ply of reused newsprint and three upper plies of ground old newsprint, impingement formed. The sample was pressed and dried after each upper ply addition to determine coverage effect of each upper ply. The results are as follows:

| | |
|---|---|
| Basis weight of base ply | 45.3 gm/m$^2$ |
| Basis weight of base ply + upper plies (3) + starch | 94 gm/m$^2$ |
| Basis weight of upper plies + starch | 48.6 gm/m$^2$ |
| Basis weight final sized (3 applications) | 96 gm/m$^2$ |

EXAMPLE 5

This sample was prepared utilizing a 10 cm×15 cm base ply of reused newsprint (RNP). An upper ply utilizing ground old newsprint was separate dry formed with a forming screen and the apparatus of FIG. 3. Cationic starch (National Starch and Chemical Company Cato 270) was applied to the top surface of the base ply and the upper ply applied to the base ply. The sample was pressed and dried. The upper ply was surface sized with a commercial spray starch and dried. A lower ply utilizing ground old newsprint was separate dry formed with a forming screen and the apparatus of FIG. 3. Starch was applied to the bottom surface of the base ply and the lower ply applied to the opposite side of the base ply from the upper ply. The sample was pressed and dried. The lower ply was surface sized with a commercial spray starch and dried. Both top and bottom surfaces were surface sized a second time and dried. Measured results are as follows:

| | |
|---|---|
| Basis weight of base ply | 47.3 gm/m$^2$ |
| Basis weight of upper ply + starch | 54.0 gm/m$^2$ |
| Basis weight of upper ply fiber | 44.3 gm/m$^2$ |
| Basis weight of upper ply starch | 9.7 gm/m$^2$ |
| Basis weight of lower ply + starch | 49.3 gm/m$^2$ |
| Basis weight of lower ply fiber | 43.7 gm/m$^2$ |
| Basis weight of lower ply starch | 5.6 gm/m$^2$ |
| Basis weight final sized (2 applications) | 162 gm/m$^2$ |

EXAMPLE 6

This sample utilized a 13.8 cm×13.8 cm base ply of reused office waste (ROW), laser printed copy grade. An upper ply was wet formed in a hand mold. Forming wire was 30 mesh. The furnish was repulped office waste (laser printed copy grade, 20 lb. subweight), 0.5% consistency. The upper ply was drained and combined with the base ply. Before combining, starch (National Starch and Chemical Company Kofilm 280, 5% solids) was applied to the top surface of the base ply. Consistency after combining, couching from the mold and pressing was 35.8%. The sample was weighed, dried, and weighed again. Measured results:

| | |
|---|---|
| Basis weight of base ply | 76.1 gm/m$^2$ |
| Basis weight of upper ply + starch | 60.9 gm/m$^2$ |
| Basis weight of upper ply fiber | 58.5 gm/m$^2$ |
| Basis weight of starch | 2.4 gm/m$^2$ |
| Caliper | 0.28 mm |

EXAMPLE 7

A base ply was prepared from reused office waste (ROW) which consisted of laser printed copy grade. The printed surface of the base ply was abraded using an 80 grit abrasive sheet. The sample was weighed, and a ply bonding agent (commercial spray starch) sprayed on the abraded (top)

surface of the base ply. The sample was weighed and placed in the dry former of FIG. 3, and an upper ply impingement formed. The upper ply furnish was comminuted unprinted copy grade. The sample was weighed, pressed and dried. The sample was weighed, hand calendered between a steel plate and a steel roll, and surface sized with a spray starch. The sample was weighed, dried, weighed and hand calendered. Measured results:

| | |
|---|---|
| Basis weight of base ply before abrading | 77.5 gm/m$^2$ |
| Caliper of base ply | 0.16 mm |
| Basis weight of base ply after abrading printed surface | 60.6 gm/m$^2$ |
| Caliper of base ply after abrading printed surface | 0.12 mm |
| Final basis weight after upper ply combined and sized | 82.9 gm/m$^2$ |
| Caliper of multiply web after calendering | 0.20 mm |

The trials demonstrated that while application of ply bonding agent was most effective when applied between the base and upper and lower plies prior to combining the plies, a bonding agent applied after combining the plies provided satisfactory ply bond as long as the distribution method assured that the bonding agent penetrated the base ply/upper ply and base ply/lower ply interface. This distribution was normally accomplished by pressing the combined plies before drying or otherwise setting of the bonding agent.

Consistency after bonding a dry formed upper ply (comminuted office waste) to a base ply (reused office waste, ROW) was measured at 73%. The primary source of moisture present in the couched sample was due to the use of an aqueous starch bonding agent applied to the base ply before combining the plies. This compares to about 50% consistency entering the dryer section for wet formed paper. This represents a substantial reduction in water removed during drying of the paper as compared to wet formed sheets.

Accordingly the reader will see that the paper web of the present invention provides a sheet utilizing a post-manufactured ply as the base or strength ply. The invention also provides the following benefits:

A significant portion of the final paper product, the base ply, is reused, eliminating the need for repulping or reforming steps used in conventional recycled paper manufacturing;

The upper and lower plies may be dry formed, eliminating water used in the pulping and forming processes;

Capital costs associated with repulping and drying are significantly reduced;

Moisture into the dryer section is reduced, significantly reducing energy consumed in the drying process; and Wastewater effluent is eliminated in the process.

Although the description above contains many specifications, these should not be construed as limiting the scope of the invention but as merely providing illustrations of some of the presently preferred embodiments of this invention. Thus the scope of the invention should be determined by the appended claims and their legal equivalents, rather than by the examples given.

I claim:

1. A multiply paper web comprising:
    a base ply comprising post-manufactured paper selected from the group of waste paper and waste paperboard and, the post-manufactured paper comprising a wet formed ply wet formed from an aqueous stock suspension comprising cellulose fibers, the post-manufactured paper having been dried, and further processed by a finishing operation;
    a first upper ply comprising formed papermaking fibers; and
    a ply bonding agent between the base ply and the first upper ply for bonding the base ply and the first upper ply together.

2. The multiply paper web of claim 1 wherein the first upper ply is dry formed and comprises a dispersed bonding agent, the dispersed bonding agent bonding the papermaking fibers of the first upper ply.

3. The multiply paper web of claim 2 wherein the first upper ply is separately formed and bonded to the base ply after forming the first upper ply.

4. The multiply paper web of claim 2 wherein the first upper ply is impingement formed on the base ply.

5. The multiply paper web of claim 2 wherein the ply bonding agent and the dispersed bonding agent are starch.

6. The multiply paper web of claim 1 wherein the first upper ply is wet formed from an aqueous solution of papermaking fibers.

7. The multiply paper web of claim 1 comprising a first lower ply bonded to the base ply at the opposite side of the base ply from the first upper ply, the first lower ply comprising formed papermaking fibers.

8. The multiply paper web of claim 1 further comprising a second upper ply, the second upper ply formed from papermaking fibers of a different grade than the papermaking fibers of the first upper ply, and a second ply bonding agent bonding the second upper ply to the top surface of the first upper ply.

9. The multiply paper web of claim 1 wherein the post-manufactured paper of the base ply comprises a reused post-consumer waste paper.

10. The multiply paper web of claim 9 wherein the post-manufactured paper of the base ply comprises reused newsprint paper.

11. The multiply paper web of claim 9 wherein the post-manufactured paper of the base ply comprises reused office waste paper.

12. The multiply paper web of claim 1 wherein the ply bonding agent is starch.

13. The multiply paper web of claim 1 comprising a pigmented coating on the top surface of the first upper ply.

14. The multiply paper web of claim 1 wherein the finishing operation comprises a sheeting operation.

15. The multiply paper web of claim 1 wherein the post-manufactured paper of the base ply has been printed on at least one side.

16. The multiply paper web of claim 15 wherein at least some of the printing has been removed by a print removal operation.

17. The multiply paper web of claim 16 wherein the print removal operation comprises an abrading process.

18. The multiply paper web of claim 1 wherein a second multiply paper web of claim 1 is utilized as the post-manufactured paper.

19. The multiply paper web of claim 1 wherein the first upper ply comprises a first layer comprising a first grade of papermaking fibers and a second layer comprising a second grade of papermaking fibers, said first layer and said second layer bonded by an internal bonding agent.

20. A multiply paper web comprising:
    a base ply comprising post-manufactured paper selected from the group of waste paper and waste paperboard and, the post-manufactured paper comprising a wet formed ply wet formed from an aqueous stock suspension comprising cellulose fibers, the post-manufactured paper having been dried, and further processed by a finishing operation;
    a first upper ply dry formed from papermaking fibers;

a ply bonding agent between the base ply and the first upper ply for bonding the base ply and the first upper ply together; and a dispersed bonding agent in the first upper ply for bonding the dry formed papermaking fibers together.

21. A process for making a multiply paper web, the process comprising the steps of:

dry forming an upper ply by passing a suspension of a first papermaking fiber in a moving gas stream through a forming screen; and introducing a bonding agent between the upper ply and a base ply to bond the upper ply to the base ply, the base ply comprising post-manufactured paper, the post-manufactured paper selected from the group of waste paper and waste paperboard and comprising a wet formed ply wet formed from an aqueous stock suspension comprising cellulose fibers, the post-manufactured paper having been dried, and further processed by a finishing operation.

22. The process of claim 21 wherein the bonding agent is introduced between the upper ply and the base ply by applying the bonding agent to the base ply before combining the upper ply and the base ply.

23. The process of claim 21 wherein the bonding agent is introduced between the upper ply and the base ply by applying the bonding agent to the upper ply before combining the upper ply and the base ply.

24. The process of claim 21 wherein the bonding agent is introduced between the upper ply and the base ply by applying the bonding agent to the upper ply and dispersing the bonding agent across an interface between the upper ply and the base ply.

25. The process of claim 24 wherein the dispersing of the bonding agent is accomplished by pressing the multiply web after combining the upper ply and the base ply.

26. A process for making a multiply paper web, the process comprising the steps of:

applying a bonding agent to a top surface of a base ply, the base ply comprising a post-manufactured paper selected from the group of waste paper and waste paperboard and, the post-manufactured paper comprising a wet formed ply wet formed from an aqueous stock suspension comprising cellulose fibers, the post-manufactured paper having been dried, and further processed by a finishing operation;

impinging a gas suspension comprising dry papermaking fibers onto the top surface of the base ply to form an upper ply; and setting the bonding agent for adhering the upper ply to the base ply.

27. The process of claim 26 wherein the multiply web is pressed before setting the bonding agent to disperse the bonding agent into the fibers of the upper ply.

28. A process for making a multiply paper web, the process comprising the steps of:

wet forming an upper ply by draining an aqueous suspension comprising papermaking fibers through a forming screen;

applying a base ply to the upper ply, the base ply comprising post-manufactured paper, the post-manufactured paper selected from the group of waste paper and waste paperboard and comprising a wet formed ply wet formed from an aqueous stock suspension comprising cellulose fibers, the post-manufactured paper having been dried, and further processed by a finishing operation; and drying the multiply web.

29. A multiply paper web comprising:

a base ply comprising unrepulped post-manufactured paper selected from the group of waste paper and waste paperboard;

a first upper ply comprising formed papermaking fibers;

a first lower ply comprising formed papermaking fibers; and a ply bonding agent between the base ply and the first upper ply and the base ply and the first lower ply for bonding the first upper ply and the first lower ply to the base ply.

30. The paper web of claim 29 wherein the post-manufactured paper is post consumer waste.

31. The paper web of claim 29 wherein the post-manufactured paper is old newsprint.

32. The paper web of claim 29 wherein the post-manufactured paper is post consumer waste paperboard.

\* \* \* \* \*